United States Patent Office 2,974,087
Patented Mar. 7, 1961

2,974,087

1-METHYL-4-NITRO-5-CYANO-IMIDAZOLE COMPOSITIONS FOR TREATING COCCIDIOSIS

Edward F. Rogers, Middletown, N.J., assignor to Merck & Co., Inc., Rahway, N.J., a corporation of New Jersey No Drawing. Filed June 26, 1958, Ser. No. 744,671

3 Claims. (Cl. 167—53.1)

This invention relates generally to the prevention and treatment of coccidiosis. More particularly it is concerned with 1-methyl-4-nitro-5-cyano-imidazole, the effectiveness of this imidazole as a coccidiostat, and with novel compositions containing said substance.

Coccidiosis is a common and widespread poultry disease caused by several species of protozoan parasites of the genus Eimeria, such as *E. tenella, E. necatrix, E. acervulina, E. maxima, E. hagani* and *E. brunetti*. *E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing what is known as intestinal coccidiosis. Related species of coccidia such as *E. meleagridis* and *E. adenoides* are caustive organisms of coccidiosis in turkeys. When left untreated, the severe forms of coccidiosis lead to poor weight gain, reduced feed efficiency and high mortality in fowl. The elimination or control of this disease is, therefore, of paramount importance to the poultry raising industry.

I have now found that 1-methyl-4-nitro-5-cyano-imidazole is very active against protozoa which cause coccidiosis. As discussed more fully hereinbelow the development of coccidiosis is prevented when small amounts of this substance are fed to poultry. One object of the present invention, therefore, is to provide a new method for preventing and controlling coccidiosis. It is a further object to provide novel compositions which, when added to animal feedstuffs, are extremely effective in preventing coccidiosis. A still further object is provision of animal feedstuffs containing 1-methyl-4-nitro-5-cyano-imidazole. Other objects will become apparent from the ensuing discussion of my invention.

1-methyl-4-nitro-5-cyano-imidazole has the structural formula—

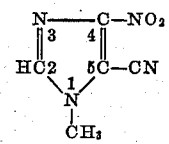

In accordance with the present invention, it has been discovered that this material is a potent coccidiostat which may be successfully employed to prevent the development of coccidiosis when administered to poultry. My new coccidiostat is conveniently fed to poultry as a component of the feed of the animals although it may also be given dissolved or suspended in the drinking water. According to a preferred aspect of the invention, novel compositions for the treatment of coccidiosis are provided which comprise 1-methyl-4-nitro-5-cyano-imidazole intimately dispersed in or intimately admixed with an inert edible carrier or diluent. By an inert edible carrier or diluent is meant one that is nonreactive with respect to the imidazole, and that may be administered with safety to the animals to be treated. The carrier or diluent is preferably one that is or may be an ingredient of the animal feed.

The compositions which are a preferred feature of my invention are the so-called feed supplements in which 1-methyl-4-nitro-5-cyano-imidazole is present in relatively large amounts and which are suitable for addition to the poultry feed either directly or after an intermediate dilution or blending step. Examples of carriers or diluents suitable for such compositions are animal feed ingredients such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The imidazole compound is intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight, of 1-methyl-4-nitro-5-cyano-imidazole are particularly suitable for addition to poultry feedstuffs; those having from about 5–20% by weight of coccidiostat are very satisfactory. The active compound is usually dispersed or mixed uniformly in the diluent but in some instances may be sorbed on the carrier. Since it is convenient for the feed manufacturer to use about one pound of feed supplement for each ton of finished feed, the preferred concentration in the supplement is usually a function of the level of active ingredient desired in the finished feed.

Very low levels of 1-methyl-4-nitro-5-cyano-imidazole in an animal feed are sufficient to afford the poultry good protection against coccidiosis. Preferably the compound is administered to chickens in an amount equal to about 0.0025% to about 0.025% by weight of the daily feed intake. Optimum results are obtained by feeding at a level of about 0.005% to 0.01% by weight of the finished feed. For therapeutic treatment of an established coccidial infection, higher amounts of 1-methyl-4-nitro-5-cyano-imidazole, i.e. up to about 0.1% by weight of the feed consumed, may be employed. The most advantageous dosage level will, of course, vary somewhat with particular circumstances such as the type and severity of the coccidial infection to be treated.

For treating poultry, the feed supplement is uniformly dispersed in the animal feed by suitable mixing or blending procedures.

Usually the feed supplements are further diluted with materials such as corn meal or soybean meal before being incorporated in the animal feed. In this intermediate processing step the level of 1-methyl-4-nitro-5-cyano-imidazole in the carrier is brought down to about 0.1%–1.0% by weight. This dilution serves to facilitate uniform distribution of the coccidiostat in the finished feed. The finished feed is one that contains a source of fat, protein, carbohydrate, minerals, vitamins and other nutritional factors.

In the above discussion of my invention, emphasis has been placed on solid compositions wherein the active ingredient is mixed with an edible carrier in a feed supplement, in a so-called premix or in the final poultry feedstuff. This is the preferred method of administering the imidazole of this invention. An alternate method of treatment is to dissolve or suspend the imidazole compound in the drinking water of the animals. The quantity of coccidiostat which may be administered in this fashion is, of course, limited by the solubility of the product in water or by the quantity that may be suspended in the water without undue settling. Emulsifiers or surfaceactive agents may be employed for this latter purpose.

This invention is not limited to coccidiostatic compositions having 1-methyl-4-nitro-5-cyano-imidazole as the sole active ingredient. Also contemplated within its scope is what might be called "combined treatment" where 1-methyl-4-nitro-5-cyano-imidazole and one or more other coccidiostats are administered concurrently. For such purposes, compositions may be prepared containing this imidazole compound admixed with one or more other coccidiostats such as sulfaquinoxaline, other sulfa compounds, 4,4'-dinitrocarbanilide-2-hydroxy-4,6-dimethylpyrimidine complex, 3,3'-dinitrodiphenyldisulfide, arsanilic acid, 3-amino-4-hydroxy-phenylarsonic acid, 5-nitrofurfural semicarbazone, and the like.

It will likewise be understood by those skilled in this art that special feed supplement formulations and finished animal feeds containing vitamins, antibiotics, growth-promoting agents and other nutritional substances may include the imidazole compound of this invention. A typical product of this type is the following:

| Ingredient: | Amount/lb. of Supplement, grams |
|---|---|
| Riboflavin | 0.64 |
| DL-calcium pantothenate | 2.10 |
| Niacin | 3.67 |
| Choline chloride | 50.00 |
| Vitamin $B_{12}$ concentrate mg | 1.30 |
| Procaine penicillin | 0.84 |
| Vitamin A (100,000 u./g.) | 3.38 |
| Vitamin $D_3$ (200,000 u./g.) | 0.68 |
| Arsanilic acid | 18.36 |
| Butylated hydroxy toluene | 23.15 |
| DL-methionine | 23.15 |
| 1-methyl-4-nitro-5-cyano-imidazole | 23.00 |
| Distillers' grains to 1 pound. | |

The following examples are given for purposes of illustration and not by way of limitation:

Example 1

166 grams of 1-methyl-4-nitro-5-chloro-imidazole were dissolved in one liter of dry ethanol and to the resulting solution was added 130 grams of potassium cyanide and 32 grams of potassium iodide. The resulting mixture was refluxed with stirring for 15 hours.

At the end of the reflux period, the mixture was cooled to room temperature and the precipitated salts filtered off. The clear filtrate was concentrated in vacuo to remove the alcohol. The residue of 1-methyl-4-nitro-5-cyano-imidazole thus obtained was recrystallized from water to give substantially pure material, melting point 141° C.

Example 2

Animal feed supplements having the following compositions are prepared by intimately mixing 1-methyl-4-nitro-5-cyano-imidazole and the particular edible solid diluent or diluents:

|  | Lbs. |
|---|---|
| A. 1-methyl-4-nitro-5-cyano-imidazole | 7.5 |
| Distillers' dried grains | 92.5 |
| B. 1-methyl-4-nitro-5-cyano-imidazole | 5.0 |
| Soybean mill feed | 50.0 |
| Fine soya grits | 45.0 |
| C. 1-methyl-4-nitro-5-cyano-imidazole | 10.0 |
| Molasses solubles | 90.0 |
| D. 1-methyl-4-nitro-5-cyano-imidazole | 15.0 |
| Corn distillers' grains | 55.0 |
| Corn germ meal | 30.0 |
| E. 1-methyl-4-nitro-5-cyano-imidazole | 20.0 |
| Wheat shorts | 30.0 |
| Distillers' dried grains | 50.0 |
| F. 1-methyl-4-nitro-5-cyano-imidazole | 25.0 |
| Corn distillers' dried grains | 75.0 |
| G. 1-methyl-4-nitro-5-cyano-imidazole | 40.0 |
| Corn meal | 60.0 |
| H. 1-methyl-4-nitro-5-cyano-imidazole | 10.0 |
| Nicarbazin | 15.0 |
| Corn distillers' dried grains | 75.0 |

These supplements are made by mechanical milling or mixing of the ingredients to insure uniform distribution of the active compound.

Example 3

Groups of three two-week old chicks were fed a mash diet containing 1-methyl-4-nitro-5-cyano-imidazole uniformly dispersed in the feed. After having been on this ration for 24 hours, each bird was inoculated with 50,000 sporulated oocysts of *E. tenella*. Other groups of three two-week old chicks were fed a similar mash diet containing no imidazole. These were also infected after 24 hours and served as positive controls. Still other groups of three two-week old chicks were fed the mash diet free of 1-methyl-4-nitro-5-cyano-imidazole and were not infected with coccidiosis. These served as normal controls.

The experiment was completed on the seventh day after infection. During the seven-day period the infected birds were observed for clinical evidence of coccidiosis. The surviving birds were weighed, sacrificed and examined for cecal coccidiosis.

The following results were obtained:

|  | Percent in Feed | Percent Mortality | Average Weight (Gms.) | | Evidence of Coccidiosis |
|---|---|---|---|---|---|
|  |  |  | Initial | Terminal |  |
| 1-Methyl-4-nitro-5-cyano-imidazole. | 0.0025 | 17 | 110 | 165 | moderate. |
|  | 0.005 | 0 | 110 | 203 | slight. |
|  | 0.01 | 0 | 110 | 186 | none. |
|  | 0.02 | 0 | 113 | 158 | none. |
| Positive Control |  | 25 | 108 | 153 | severe. |
| Normal Control |  | 0 | 120 | 206 |  |

Any departure from the above description is intended to be included within the scope of the claims.

What is claimed is:

1. A composition useful in the prevention and treatment of coccidiosis which comprises 1-methyl-4-nitro-5-cyano-imidazole in intimate dispersion in an animal feedstuff.

2. A composition useful against coccidiosis which comprises an animal feedstuff having in intimate dispersion therein from about 0.0025% to about 0.025% by weight of 1-methyl-4-nitro-5-cyano-imidazole.

3. A composition useful against coccidiosis which comprises an animal feedstuff having in intimate dispersion therein from about 0.005% to about 0.01% by weight of 1-methyl-4-nitro-5-cyano-imidazole.

References Cited in the file of this patent

Beilstein: vol. 25 (II), p. 107.